United States Patent [19]

Buschmann et al.

[11] Patent Number: 4,665,498

[45] Date of Patent: May 12, 1987

[54] TIMING DEVICE FOR PRINTING MACHINES

[75] Inventors: Falk Buschmann, Coswig; Karl-Heinz Foerster, Dresden; Volker Eichler, Weinboehla; Hartmut Heiber, Radebeul; Volmar Dittrich, Coswig, all of German Democratic Rep.

[73] Assignee: Veb Kombinat Polygraph "Werner Lamberz", Leipzig, German Democratic Rep.

[21] Appl. No.: 623,912

[22] Filed: Jun. 25, 1984

[30] Foreign Application Priority Data

Jun. 23, 1983 [DD] German Democratic Rep. ... 252272

[51] Int. Cl.⁴ .................. G04G 3/00; G05B 11/26; B41F 5/00
[52] U.S. Cl. .................................. 364/569; 101/184; 364/523
[58] Field of Search ............... 364/431.04, 565, 523, 364/569; 101/183, 184; 377/2; 250/231 SE

[56] References Cited

U.S. PATENT DOCUMENTS

| 4,009,699 | 3/1977 | Hetzler et al. | 364/431.04 X |
| 4,032,755 | 6/1977 | Bard et al. | 377/2 |
| 4,036,190 | 7/1977 | Bigliani et al. | 364/431.04 X |
| 4,116,125 | 9/1978 | Förster et al. | 101/184 X |
| 4,181,962 | 1/1980 | West, Jr. et al. | 364/565 |
| 4,232,368 | 11/1980 | Hill et al. | 364/569 X |
| 4,296,471 | 10/1981 | Goux | 364/565 X |
| 4,496,989 | 1/1985 | Hirosawa | 364/523 X |
| 4,501,008 | 2/1985 | Rosseel et al. | 377/2 |
| 4,511,797 | 4/1985 | Pohlig et al. | 250/231 SE |
| 4,549,260 | 10/1985 | Saito et al. | 364/569 |

FOREIGN PATENT DOCUMENTS 2220601 12/1972 Fed. Rep. of Germany ...... 364/523

*Primary Examiner*—Felix D. Gruber
*Attorney, Agent, or Firm*—Michael J. Striker

[57] ABSTRACT

A central timing device for controlling a plurality of working functions of a printing machine, includes a reference pulse generator, assembled to encoder discs connected to a cycle shaft of the printing machine to produce a sequence of angular increment pulses and at least one single synchronizing pulse. The reference pulse generator is connected to a pulse processing circuit which includes a first address coding device for producing binary coded addresses pertaining to angles of rotation of the machine. A second address coding device is coupled to the encoder for angular increments via a timing circuit including an AND-gate and a monostable multivibrator to produce binary coded addresses pertaining to the angle of rotation/rotary speed of the printing machine. The outputs of the first and second address generating devices are connected to addressing inputs of separate PROMs preprogrammed with desired timing signals.

4 Claims, 4 Drawing Figures

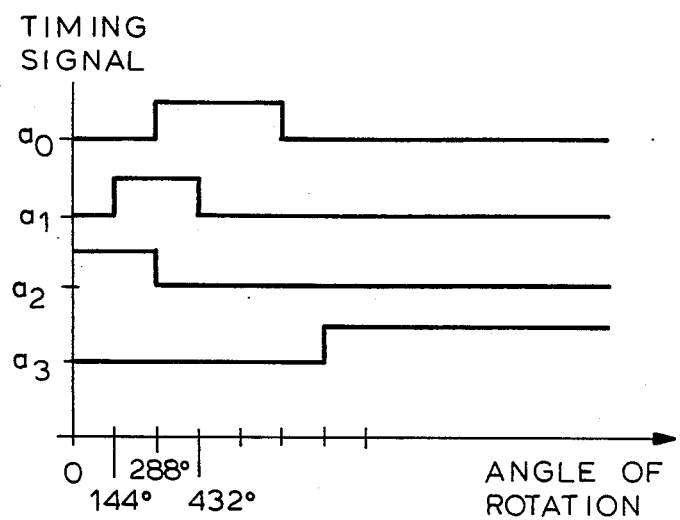
F I G. 3
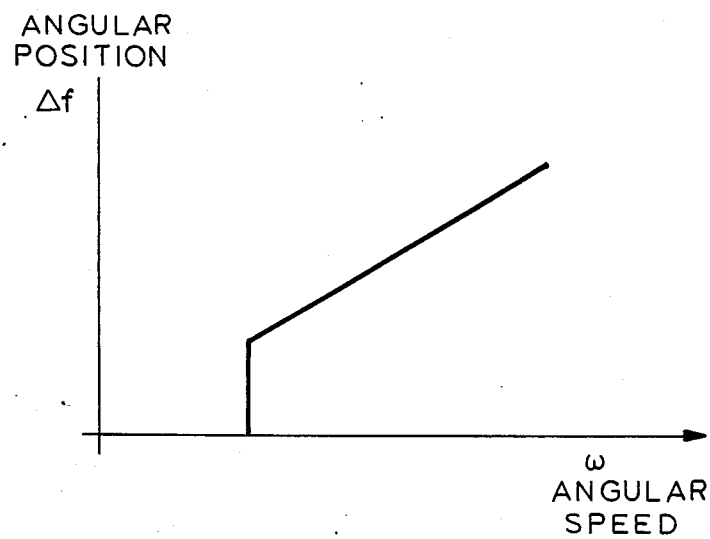
F I G. 4

TIMING DEVICE FOR PRINTING MACHINES

CROSS-REFERENCE TO RELATED APPLICATIONS

Reference is made to the copending related applications Ser. Nos. 623,911 filed June 25, 1984; 623,913 filed June 25, 1984; and 623,914 filed June 25, 1985, all assigned to the same assignee.

BACKGROUND OF THE INVENTION

This invention relates in general to timing devices and in particular to a timing device for controlling the operation of a printing machine.

Hitherto a number of decentralized timing devices have been used in connection with printing machines to control a particular partial operation such as for example a clocked sheet control, the correct sequence of feeding and discharging of prints, to synchronize sorting of sheets and the like.

From the German Pat. No. 2,220,601 a control system for multicolor rotary printing machines is known which controls the operation of printing units of the machine or individual functional groups in respective printing units in order to pass a sheet through the machine at a correct sequence of time points. This known control system includes a pulse generating stage consisting of a signal generator, an interrogating device, a signal shaper and a closed chain of shift registers to produce a timing signal corresponding to an integer part of a rotation of the cycle shaft of the machine relative to a preset angular position of the latter.

The disadvantage of this prior art timing pulse generating stage is the fact that it is designed for a single application only and consequently there are necessary many control units in the printing machine to control a variety of functions.

Furthermore, it is also disadvantageous that this known pulse generating stage can deliver only non-modified timing signals and is not designed for ready modification of its output, for example for delivering timing signals dependent on rotary speed of the machine as it is frequently desirable for controlling idling times of adjustment elements of the printing machine.

Furthermore, in order to produce timing pulses of different length the prior art control system necessitates the use of pulse shapers which again are suitable for producing a non-variable impulse length only.

SUMMARY OF THE INVENTION

A general object of the present invention is therefore to overcome the aforementioned disadvantages.

In particular, it is an object of the present invention to provide an improved timing device for printing machines which from a central unit provides different timing signals for controlling different partial operations of the machine.

A further object of this invention is to provide such an improved timing device which is simple in construction and inexpensive in manufacture.

An additional object of the invention is to provide such an improved timing device which guarantees a high degree of reproducibility and a high resolution of angular positions of the cycle shaft of the machine.

Furthermore, an object of this invention is to provide a timing device which makes it possible to readily change or modify the output timing signals.

In keeping with these objects and others which will become apparent hereafter, one feature of the invention resides, in a timing device for printing machines, in a combination which comprises a reference pulse generator for generating a sequence of pulses related to a working cycle of the printing machine, the reference pulse generator including a first generator of pulses corresponding to angular increments of rotation of the cycle shaft of the machine, at least one second generator of singular synchronizing pulses corresponding to a preset angular position of the cycle shaft, and a pulse processing device comprising a first address coding device coupled to the first generator for producing from the generated pulses binary coded addresses pertaining to angles of rotation of the machine, a second address coding device coupled to the first generator via a timing circuit for producing from the generated pulses binary coded addresses pertaining to an angle of rotation/rotary speed of the machine, and at least two programmable read only storing devices for storing preset data corresponding to timing signals for the printing machine, the storing devices being connected respectively to the first and second address coding devices to output timing signals assigned to different angles of rotation or rotary speeds of the cycle shaft.

In the preferred embodiment, the first address coding device includes a counter having a counting input connected to the first generator to count the angular increments during one cycle of the machine and delivering at parallel outputs thereof the count in the form of a binary coded word which is applied to the address inputs of the first programmable read only storing device. The counter has also parallel setting inputs connected via a setting device to the second generator for singular synchronizing pulses which periodically set the counter to zero.

The second address coding device for addressing rotary speed/angular position dependent timing signals includes a rotary speed counter connected via a timing circuit to the first generator of pulses corresponding to the angular increments of the machine. The binary coded rotary speed address generated at parallel outputs of this rotary speed counter is applied via a setting device to parallel setting inputs of a second counter whose counting input is connected to the first generator. The setting device is controlled by the second generator of singular synchronizing pulses. The parallel outputs of the second counter are connected to addressing inputs of the second programmable read only storing device.

The timing circuit in the second address coding device includes an AND-gate having an input connected to the first pulse generator and a second input connected to a monostable multivibrator and the output of the AND-gate is connected to the counting input of the rotary speed counter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 shows in a plot diagram the relationship between the angular increments of the cycle shaft of the machine and the timing signals read out at the outputs of a PROM; and FIG. 4 shows the relationship between rotary speed of the machine and an address.

DESCRIPTION OF PREFERRED EMBODIMENTS

Figure 1:
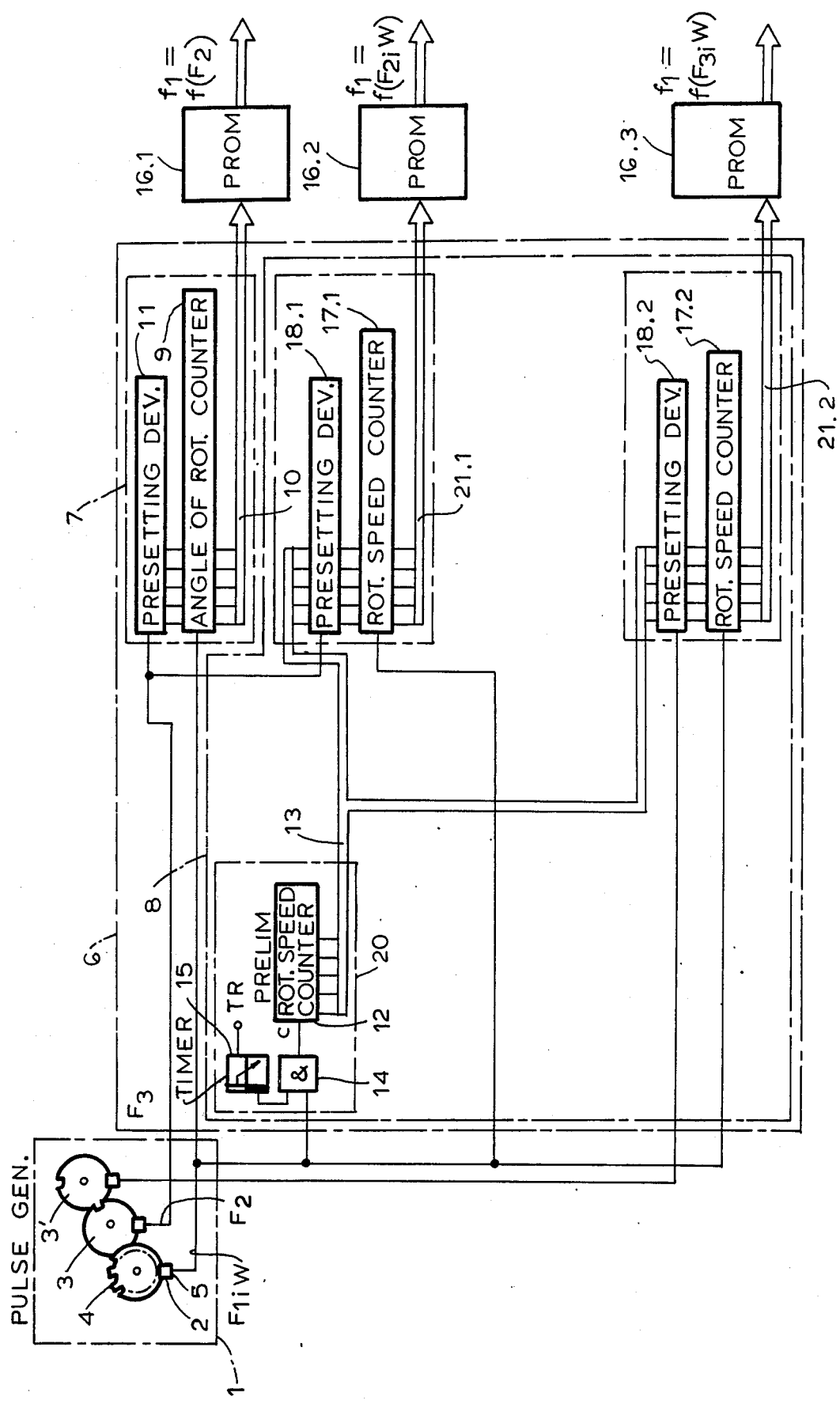
FIG. 1 is a schematic block circuit diagram of a first embodiment of the timing device of this invention.

The timing device for controlling the operation of a printing machine includes a reference pulse generator which consists of a generator of pulses corresponding to angular increments $F_1$ of rotation of the machine, and of two generators 3 and 3' for generating respectively singular synchronizing pulses $F_2$ and $F_3$. The pulse generator 2 consists of an encoder disc 4 provided on its periphery with light and dark sections which are sensed by a stationary sensor 5. The encoder disc 4 depending on the desired degree of resolution, has an equal number of the dark and light sectors. For example, the division of the circumference of the encoder disc 4 into 250 light sectors and 250 dark sectors corresponds to a resolution of $360°/250 = 1,44°$.

Preferably, the encoder disc 4 is a slotted disc and the sensor 5 operates on an optoelectric principle to derive the angular increment output signals. The generators 3 and 3' for producing singular synchronizing pulses correspond in construction to the pulse generator 2 with the difference that the encoder disc of each generator 3 and 3' has only one segment or slot corresponding to a preset angular position $F_2$ or $F_3$.

The encoder discs 3, 3' and 4 are arranged on a common shaft which is coupled to the printing machine, namely to the so-called cycle shaft which performs one rotation during each working cycle of the machine.

In this example, the timing device includes a pulse processing circuit 6 having at least one address coding device 7 for producing angle of rotation addresses and an address coding device 8 for producing angle of rotation/rotary speed addresses.

The angle of rotation address coding device 7 consists of a counter 9 for counting the successive angular increments of the printing machine. The counting input of the counter 9 is connected to the sensor 5 of the pulse generator 2. Parallel outputs of the counter 9 are connected to a data bus 10 which transfers a binary coded address pertaining to the angle of rotation of the machine to an assigned storing device, as it will be described below. Parallel setting inputs of counter 9 are connected via a resetting device 11 to the sensor of the pulse generator 3 which transmits during one rotation of the machine a single synchronizing or resetting pulse to the counter 9.

The angle of rotation/rotary speed address coding device 8 includes a rotary speed counting circuit 20 consisting of an AND-gate 14, a monostable multivibrator 15 and a counter 12. An input of the AND-gate 14 is connected to the sensor 5 of the angular increment pulse generator 2, the second input of the AND-gate is connected to the multivibrator 15 and the output of the AND-gate is connected to the counting input of the counter 12. The parallel ouputs of the counter 12 deliver a binary word corresponding to the binary coded rotary speed address for the storing device.

In addition, the angle of rotation/rotary speed address coding device 8 comprises two counters 17.1 and 17.2 each having parallel setting inputs connected via a presetting device 18.1 or 18.2 to an assigned pulse generator 3 or 3' for singular synchronizing pulses. Each presetting device 18.1 or 18.2 has parallel setting inputs connected via a data bus 13 to the output of the rotary speed counter 12. The counting inputs of counter 17.1 and 17.2 are connected to the output of the pulse generator 2. The parallel outputs of each counter 17.1 and 17.2 deliver a binary coded address pertaining to an angle of rotation/rotary speed of the machine and the address is transferred via data buses 21.1 and 21.2 to corresponding address inputs of the assigned programmable read only storing device (PROM) 16.1, 16.2 or 16.3.

Each PROM 16.1, 16.2 and 16.3 is of a design known from prior art and include the following functional blocks:

Storing matrix whose crossing points store the program bits of timing signals $f_1$ correlated to different angles of rotation and different rotary speeds of the cycle shaft;

Decoding circuit including column and row decoders. The row decoder interprets a row of the matrix. Column decoder interprets the columns of the row. The decoding circuit reads out the information stored in the crossing points of the matrix and applies the read out word to output buffers;

The output buffers amplify the read out timing signal and forward the same for further processing;

Y-gating activates by means of the column decoder the read out columns of the matrix and supplies the read contents to the output buffer.

The first storing device 16.1 (first PROM) has its addressing inputs connected to the data bus 10 from the address coding or generating device 7. According to the supplied address from the data bus 10, the output of PROM 16.1 delivers a timing signal $f_1 = f(F_2)$, that means the timing signals $f_1$ stored in PROM 16.1 are programmed as a function of the angular position of the cycle shaft of the machine referred to the single synchronizing pulse $F_2$. If desired, it is possible to include the pulse processing circuit 6 an additional angle of rotation address coding device corresponding to the device 7 and having its counter connected to an additional generator of pulses corresponding to angular increments whereby the presetting device of the additional counter is connected to the generator 3' of the single synchronizing pulse. The output signal of the additional non-illustrated counter is applied to an additional PROM whose output bus would deliver stored signals addressed in dependency on the angular position of the encoder of the generator 3'.

In the first embodiment illustrated in FIG. 1, the address data bus 13 is directly connected to parallel setting inputs of the presetting devices 18.1 and 18.2 of the rotary speed address generating counters 17.1 and 17.2. The control input of the presetting device 18.1 is connected to the generator 3 for the single synchronizing pulse $F_2$, whereas the control input of the second presetting device 18.2 is connected to the generator 3' for another single synchronizing pulse $F_3$. Accordingly, the addresses transferred from the parallel outputs of the counter 17.1 via data bus 21.1 to the PROM storing device 16.2 read out timing signals $f_1 = f(F_2; W)$, that is the timing signals are related both to the single synchronizing pulse $F_2$ and to the rotary speed W of the cycle shaft of the printing machine. In a similar fashion, the output signals $f_1$ of the third PROM device 16.3 are dependent on the other single synchronizing pulse $F_3$ and on the rotary speed W of the machine ($f_1 = f(F_3; W)$).

Figure 2:
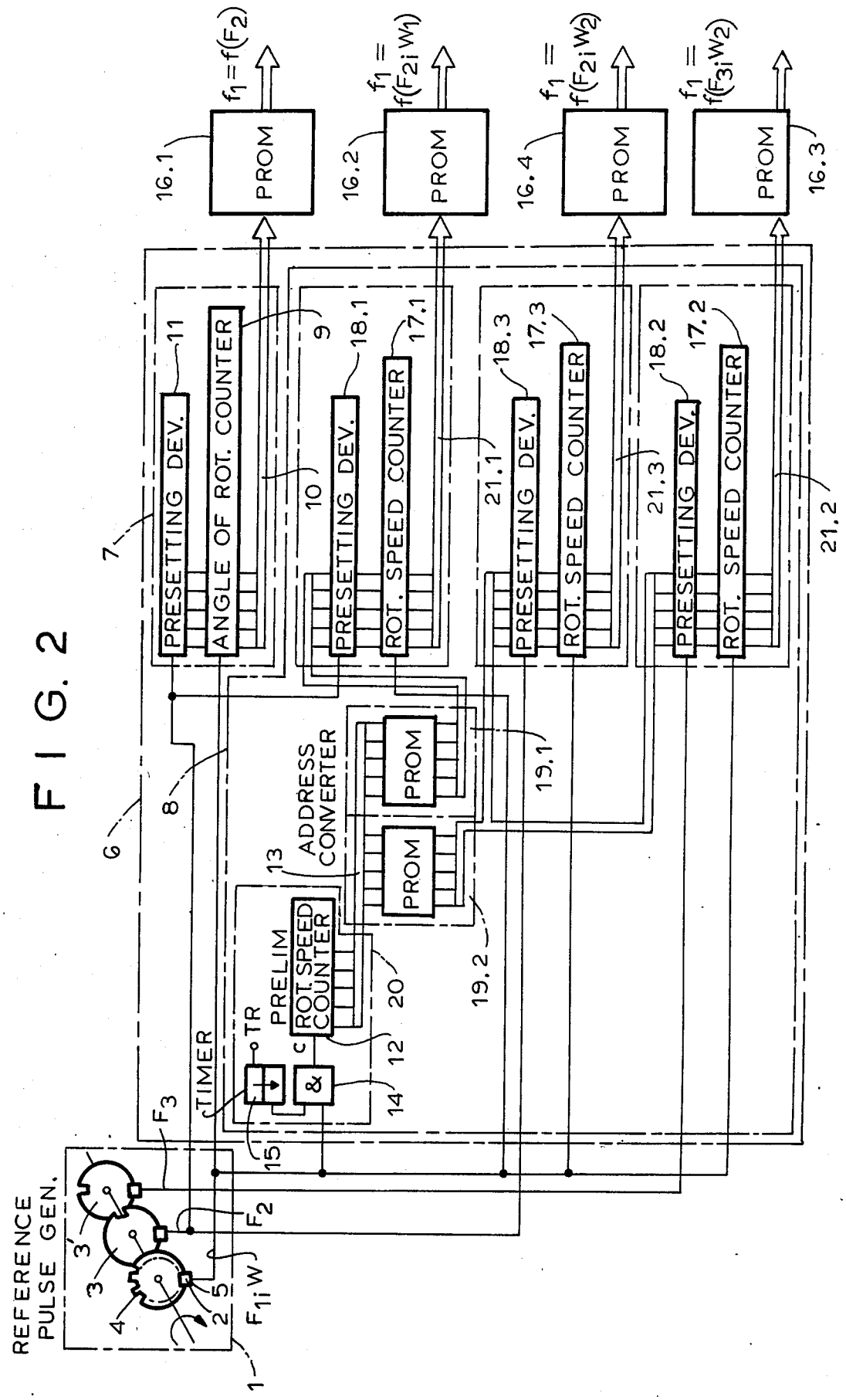
FIG. 2 is another embodiment of the timing device of this invention having an address modifier.

In the embodiment of the timing device illustrated in FIG. 2 there is provided an additional address generating counter 17.3 with the associated presetting devices 18.3 and an additional (output PROM) storing device 16.4 whose addressing inputs are connected to the outputs of counter 17.3 via an address data bus 21.3. In addition, the parallel inputs of address converting circuits 19.1 and 19.2 are connected to the data bus 13 from the rotary speed counter 12. Each address converting circuit 19 consists of a PROM (storing device) corresponding in structure to storing devices 16.1 to 16.4 at the output of the pulse processing circuit 6. The outputs of the first converting circuit 19.1 are connected to setting inputs of the presetting device 18.1 of the angular position counter 17.1. The outputs of the second address converting circuit 19.2 are connected to the inputs of presetting devices 18.2 and 18.3 of angular position counters 17.2 and 17.3. The output address from the parallel outputs of the counter 17.1 is connected, similarly as in the preceding example, via data bus 21.1 to the addressing inputs of the PROM 16.2. At the outputs of the PROM 16.2, timing signals $f_1$ are read out as a function of the single synchronizing pulse $F_2$ and of a modified rotary speed $W_1$ of the cycle shaft of the machine.

The second address generating counter 17.2 whose presetting device 18.2 is connected to the pulse generator 3' and whose setting inputs are connected to the output of the second address converting PROM device 19.2, is connected via the data bus 21.2 to the addressing inputs of the PROM 16.3 so that at the outputs of the latter timing pulses $f_1$ are read out which are the function of the single synchronizing pulse $F_3$ from the pulse generator 3' and of the rotary speed $W_2$ which has been modified from the rotary speed W of the cycle shaft by the address converting device 19.2.

Similarly, the third angle of rotation counting circuit 17.3 whose presetting circuit 18.3 is connected as the similar circuit 18.2 to the output of the address converting device 19.2, has its parallel outputs connected to the addressing inputs of the fourth PROM device 16.4. Since the control input of the setting device 18.3 is connected to the pulse generator 3 delivering a single synchronizing pulse $F_2$, the output $f_1$ at the storing device 16.4 is a function of the single synchronizing pulse $F_2$ and of the modified rotary speed $W_2$ of the printing machine.

The operation of the timing device according to this invention is as follows:

As soon as the pulse generator 3 in the reference pulse circuit 1 delivers a single synchronizing pulse $F_2$ to the resetting device 11 of counter 9 of the address producing circuit 7, the counter 9 is reset to zero and made ready for receiving the angular increments $F_1$ delivered from the pulse generator 2. The pulses corresponding to consecutive angular increments are continuously added in the counter 9 and the result of the addition is read out as a binary coded address at the parallel outputs of the counter 9 and transferred via the data bus 10 to the addressing inputs of the PROM device 16.1. The binary value of the address transferred by the data bus 10 corresponds to the momentary actual angular position of the cycle shaft of the printing machine relative to a starting position preset by the pulse $F_2$ from the encoder disc of the single pulse generator 3.

During one cycle of the printing machine, provided that the encoder disc is divided by coding segments each corresponding to 1.44° angular increment, there are 250 counting results at the output of counter 9 corresponding to 250 binary coded addresses. These addresses are consecutively applied to activate the PROM device 16.1. The storing device 16.1 has been programmed in conventional manner to store a desired pattern of bits of timing signals $f_1$ which to be read out at the output of the PROM when addressed by the signal from the data bus 10. In this manner the beginning and the end and hence the length of the timing signals are programmable.

EXAMPLE

| PROM ADDRESS | STORED CONTENTS | | | | | | | |
|---|---|---|---|---|---|---|---|---|
| 0 | 0 | 0 | L | 0 | 0 | 0 | 0 | 0 |
| 1 | 0 | L | L | 0 | | | | |
| 2 | L | L | 0 | 0 | | | | |
| 3 | L | 0 | 0 | 0 | | | | |
| 4 | L | 0 | 0 | 0 | | | | |
| 5 | 0 | 0 | 0 | 0 | | | | |
| 6 | 0 | 0 | 0 | L | | | | |
| . | . | | | | | | | |
| . | . | | | | | | | |
| 250 | 0 | 0 | 0 | L | | | | |
| Output | $a^0$ | $a^1$ | $a^2$ | $a^3$ | $a^4$ | $a^5$ | $a^6$ | $a^7$ |

The memory outputs $a^0$ through $a^7$ are incorporated in a data bus which in this example delivers output signals $f_1$ which are a function of the single synchronizing pulse $F_2$.

FIG. 3 illustrates the output timing signals $a^0$ through $a^3$ for consecutive angular increments of 1.44° starting at $F_2$ equals 0°.

The address related to the rotary speed of the cycle shaft of the printing machine is produced in the circuit 20 as follows: Pulses generated by the device 2 and corresponding to angular increments of the cycle shaft of the machine, are applied to one input of an AND-gate 14. The other input is connected to a timing device in the form of a monostable multivibrator 15 which when triggered by a trigger pulse at its input TR, opens according to its preset holding time and makes the gate 14 operative for the holding time internal. The resulting output pulses C from the gate 14 are counted in counter 12.

The counts of the pulses C are read out as binary words at the parallel outputs of the counter 12 and applied as rotary speed addresses to the bus 13.

In the embodiment according to FIG. 1 the binary coded addresses from the counter 12 serve for controlling the presetting devices 18.1 and 18.2 of counters 17.1 and 17.2 for counting the angular increments $F_1$. The operation of the counters 17.1 and 17.2 corresponds to that of the counter 9 for coding the addresses pertaining to the angle of rotation. Due to the continuous presetting of the counts in the counter 17.1 and 17.2 in dependency on the holding time of the multivibrator 15, the addresses at the counters mathematically correspond to the rotary speed of the cycle shaft of the printing machine.

The operation of the first counter 17.1 and of the second counter 17.2 is the same and in the following description only the operation of the first counter 17.1 will be described. For producing a certain starting condition per one rotation of the cycle shaft of the machine, the counter 17.1 is first set to zero in response to the single synchronizing pulse $F_2$ from the generator 3. The counter 17.1 is constructed as a monolithic intergating circuit which apart from the resetting or control input (zero position) has parallel setting inputs which in response to a loading command enter, irrespective of the condition at the resetting input, a parallel binary code from the parallel outputs of the presetting device 18.1. Hence the loaded binary word from the presetting device represents the starting condition of the counter 17.1. This starting binary word is applied to the presetting device 18.1 by the rotary speed address bus 13. Accordingly, at each occurrence of the single synchronizing pulse $F_2$ the binary code of the actual rotary speed W is loaded into the counter 17.1 as its starting value.

In connection with the second programmable storing device 16.2 which is connected via data bus 21.1 to the parallel outputs of the first counter 17.1, the address inputs corresponding to the angle of rotation/rotary speed of the cycle shaft are activated and timing signals $f_1$ stored at these addresses are read out at the output of the storing device 16.2 as a function both of the single synchronizing pulse $F_2$ and of the rotary speed W ($f_1=f(F_2;W)$)

EXAMPLE

| Addresses (decimal) | Actual initial rotary speed W equals "8"(decimal) | | | | | | | | | | | | | | | |
|---|---|---|---|---|---|---|---|---|---|---|---|---|---|---|---|---|
| | Stored Contents W = 0 | | | | | | | | W ≠ 0 | | | | | | | |
| 0 | 0 | 0 | 0 | 0 | 0 | 0 | 0 | 0 | L | 0 | 0 | 0 | L | L | L | L |
| 1 | 0 | L | L | 0 | 0 | 0 | 0 | 0 | . | | | | | | | |
| 2 | 0 | L | L | L | 0 | 0 | 0 | 0 | . | | | | | | | |
| 3 | L | L | 0 | L | 0 | 0 | 0 | 0 | . | | | | | | | |
| 4 | L | L | 0 | 0 | 0 | 0 | 0 | 0 | . | | | | | | | |
| 5 | L | L | 0 | L | 0 | 0 | 0 | 0 | . | | | | | | | |
| 6 | L | 0 | 0 | 0 | 0 | 0 | 0 | 0 | . | | | | | | | |
| 7 | L | 0 | 0 | L | 0 | 0 | 0 | 0 | . | | | | | | | |
| 8 | L | 0 | 0 | 0 | L | L | L | L | . | | | | | | | |
| . | | | | | | | | | | | | | | | | |
| 250 | 0 | 0 | 0 | 0 | 0 | 0 | 0 | 0 | 0 | 0 | 0 | 0 | 0 | 0 | 0 | 0 |
| Outputs | $a_0$ | $a_1$ | $a_2$ | $a_3$ | $a_4$ | $a_5$ | $a_6$ | $a_7$ | $a_0$ | $a_1$ | $a_2$ | $a_3$ | $a_4$ | $a_5$ | $a_6$ | $a_7$ |

It will be seen that at the output of the second PROM 16.2 timing pulses $f_1$ which are a function of the single synchronizing pulse $F_2$ and of the angular speed W of the cycle shaft, are available.

Since the second counter 17.2 is connected to the output of the generator 2' delivering single synchronizing pulses $F_3$, at the output of the third programmable storing device 16.3 the output signals $f_1$ are produced which are a function of the pulses $F_3$ and of the angular speed W of the cycle shaft. The incremental output signals related to the single synchronizing pulses $F_2$ or $F_3$ are in a linear dependency on the rotary speed W. As a consequence, equivalent changes of the rotary speed W produce the same presetting of signals within the entire range of rotary speeds of the cycle shaft.

In the embodiment according to FIG. 2 the output of the rotary speed counter 12 is not applied directly to the presetting devices 18 of the counter 17. Instead the coded addresses at the output of the counter 12 undergo a conversion in one or more address converting devices. The address conversion is made in order to obtain a modified dependency from the linear dependency (increase m=1/1) of the output rotary speed addresses.

Under the term modified dependency is to be understood the following:

linear dependency with an increase m≠1 linear dependency with an increase m=1/1 or m 1 with a partial suppression of the angular speed components. For example, in the speed range from 0 to 1,000 no information is produced (suppression) and only from rotary speed value above 1,000 a speed component is produced.

non-linear dependency.

The address converting devices 19.1 and 19.2 contain PROMs which are preprogrammed with a desired pattern of bits. Accordingly, in response to addresses transferred via data bus 13, the PROM in the converting devices 19.1 and 19.2 delivers at its output a certain binary word corresponding to the stored pattern of binary data. In this manner, the modified version of the rotary speed address can be preprogrammed. For example, for the following internal program of the devices 19.1 and 19.2 the following linear dependency with a partial suppression of the angular speed will result (as illustrated in the diagram in FIG. 4):

| Applied address (decimal) | | | | | | | | | |
|---|---|---|---|---|---|---|---|---|---|
| 0 | 0 | 0 | 0 | 0 | 0 | 0 | 0 | 0 | 0 |
| 1 | 0 | 0 | 0 | 0 | 0 | 0 | 0 | 0 | 0 |
| 2 | 0 | 0 | 0 | 0 | 0 | 0 | 0 | 0 | 0 |
| 3 | 0 | 0 | 0 | 0 | 0 | 0 | 0 | 0 | 0 |
| 4 | 0 | 0 | 0 | 0 | 0 | 0 | 0 | 0 | 0 |
| 5 | 0 | 0 | 0 | 0 | 0 | L | 0 | 0 | |
| 6 | 0 | 0 | 0 | 0 | 0 | L | 0 | L | |
| 7 | 0 | 0 | 0 | 0 | 0 | L | L | 0 | |
| 8 | 0 | 0 | 0 | 0 | 0 | L | L | L | |
| 9 | 0 | 0 | 0 | 0 | L | 0 | 0 | 0 | |
| 10 | | | | | | | | | |
| | $d_7$ | $d_6$ | $d_5$ | $d_4$ | $d_3$ | $d_2$ | $d_1$ | $d_0$ | |
| | | | | Outputs | | | | | |

By providing two address converting devices 19.1 and 19.2, an address modification according two independent criteria is made possible.

It will be understood that each of the elements described above, or two or more together, may also find a useful application in other types of constructions differing from the types described above.

While the invention has been illustrated and described as embodied in specific examples of a timing device for ptinting machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A timing device for controlling the operation of a printing machine, including a reference pulse generator for generating a sequence of pulses related to a working cycle of the printing machine, the reference pulse generator including a first generator of pulses corresponding to incremental angles or rotation of a part of the printing machine, at least one second generator of singular synchronizing pulses corresponding to a present angular position of said part of the printing machine, and a pulse processing device comprising a first address coding device coupled to the first generator for producing binary coded address pertaining to said angles of rotation, a second address coding device coupled via a timing circuit to the first generator for producing binary coded addresses pertaining to angles of rotation/rotary speed of said part of the printing machine, and at least two programmable read only storing devices connected, respectively, to the first and second address coding devices to read out preset timing data stored at the addressed locations.

2. A timing device as defined in claim 1, wherein the first address coding device comprises a resetting device having a control input connected to the second generator and a plurality of resetting outputs, an angle of rotation counter having a counting input connected to the first generator, a plurality of setting inputs connected with the outputs of the resetting device and a plurality of parallel outputs for reading out a coded address corresponding to the angle of rotation of said part of the machine.

3. A timing device as defined in claim 1, wherein the second address coding device comprises a first rotary speed address counter (17.1) having a counting input, a plurality of parallel outputs and a plurality presetting inputs, a presetting device having a control input connected to the second generator, a plurality of outputs connected to the setting inputs of the address counter, and a plurality of setting inputs, a preliminary rotary speed address counter having a counting input, a plurality of parallel outputs connected to the setting inputs of the presetting device, said timing circuit comprising a monostable multivibrator, an AND-gate having an input connected to the first generator, a second input connected to the monostable multivibrator and an output connected to the counting input of the preliminary rotary speed counter, whereby the parallel outputs of the first rotary speed address counter are connected via a data bus to one of the two programmable storing devices to apply angle of rotation/rotary speed coded addresses to the latter.

4. A timing device as defined in claim 3, further comprising an address converting circuit connected between the parallel outputs of the preliminary rotary speed address counter and the parallel inputs of the presetting device for the first rotary speed address counter, said address converting circuits each including a programmable read only memory programmed according to a desired conversion pattern.

* * * * *